United States Patent
Beric et al.

(10) Patent No.: US 9,432,679 B2
(45) Date of Patent: Aug. 30, 2016

(54) DATA PROCESSING SYSTEM

(75) Inventors: Aleksandar Beric, Eindhoven (NL); Ramanathan Sethuraman, Bangalore (IN)

(73) Assignee: ENTROPIC COMMUNICATIONS, LLC, Carlsbad, CA (US)

( * ) Notice: Subject to any disclaimer, the term of this patent is extended or adjusted under 35 U.S.C. 154(b) by 2452 days.

(21) Appl. No.: 12/092,129

(22) PCT Filed: Oct. 27, 2006

(86) PCT No.: PCT/IB2006/053976
§ 371 (c)(1),
(2), (4) Date: Sep. 19, 2008

(87) PCT Pub. No.: WO2007/052203
PCT Pub. Date: May 10, 2007

(65) Prior Publication Data
US 2009/0219446 A1    Sep. 3, 2009

(30) Foreign Application Priority Data
Nov. 1, 2005   (EP) ...................................... 05110219

(51) Int. Cl.
*H04N 19/433* (2014.01)
*H04N 19/61* (2014.01)
*H04N 19/43* (2014.01)

(52) U.S. Cl.
CPC ............. *H04N 19/433* (2014.11); *H04N 19/43* (2014.11); *H04N 19/61* (2014.11)

(58) Field of Classification Search
CPC ................................................ H04N 19/00109
USPC ........................................ 375/240.01–240.29
See application file for complete search history.

(56) References Cited

U.S. PATENT DOCUMENTS 5,099,325 A   3/1992   Artieri et al.
5,400,087 A   3/1995   Uramoto et al.
(Continued)

FOREIGN PATENT DOCUMENTS

EP   1530373 A2   5/2005
JP   02-213291   8/1990
(Continued)

OTHER PUBLICATIONS

Beric, A; et al "A 2.7 MW 1.1MM<>2 Motion Estimator for Picture-Rate Up-Converter" VLSI Design, 2004. Proceedings. 17th International Conference on Mumbai, India, IEEE Computer Society, Jan. 5, 2004, pp. 1083-1088.
(Continued)

*Primary Examiner* — Andy Rao
(74) *Attorney, Agent, or Firm* — McAndrews, Held & Malloy Ltd.

(57) ABSTRACT

A data processing system is provided for processing video data on a window basis. At least one memory unit (L1) is provided for fetching and storing video data from an image memory (IM) according to a first window (R) in a first scanning order. At least one second memory unit (L0) is provided for fetching and storing video data from the first memory unit (L1) according to a second window in a second scanning order (SO). Furthermore, at least one processing unit (PU) is provided for performing video processing on the video data of the second window as stored in the at least one second memory unit (L0) based on the second scanning order (SO). The second scanning order (SO) is a meandering scanning order being orthogonal to the first scanning order (SO1).

10 Claims, 3 Drawing Sheets

(56) References Cited

U.S. PATENT DOCUMENTS

Figure 1:
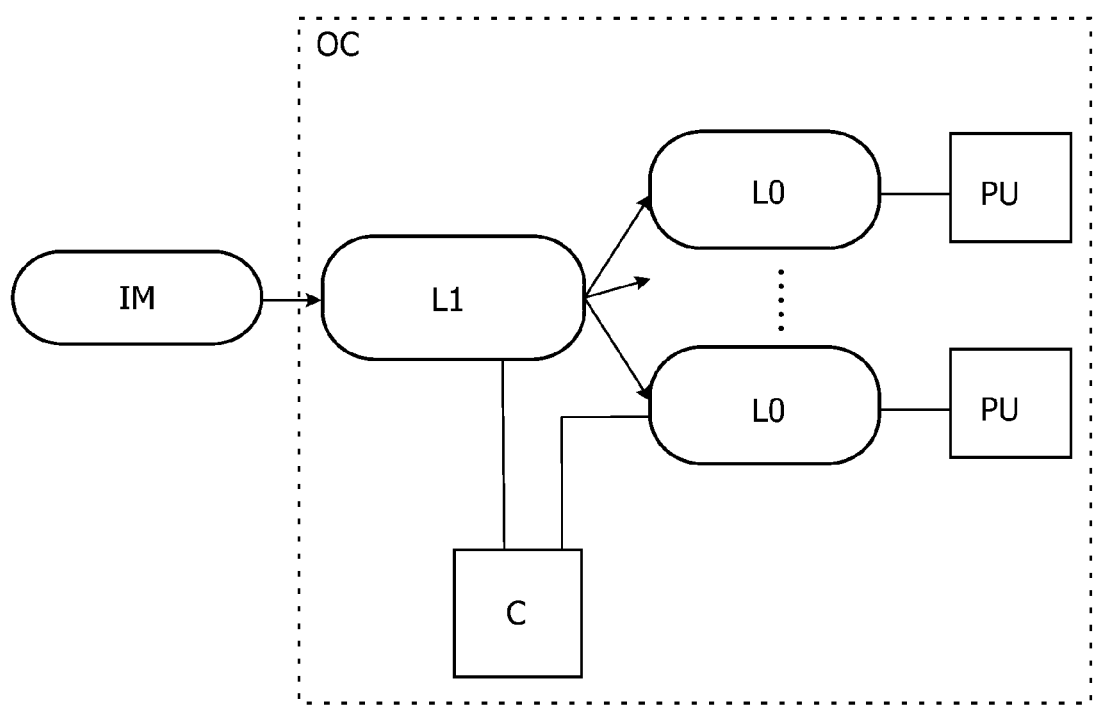

| | | | | |
|---|---|---|---|---|
| 5,581,731 | A | * | 12/1996 | King et al. .................... 711/144 |
| 6,658,148 | B1 | | 12/2003 | Fung et al. |
| 7,133,046 | B2 | * | 11/2006 | Savekar et al. ............... 345/502 |
| 2005/0238098 | A1 | | 10/2005 | Fandrianto et al. |

FOREIGN PATENT DOCUMENTS

| | | |
|---|---|---|
| JP | 06-113290 | 4/1994 |
| JP | 2001357399 A | 12/2001 |
| JP | 2005160021 A | 6/2005 |
| JP | 2008537620 A | 9/2008 |
| WO | 2006100625 A1 | 9/2006 |

OTHER PUBLICATIONS

Colavin, O; et al "A Dedicated Circuit for Real Time Motion Estimation" Euro Asic '91 Paris, France, IEEE Computer Society, May 27, 1991, pp. 96-99.

Chien, S-Y; et al "Hardware Architecture Design of Video Compression for Multimedia Communication Systems" IEEE Communications Magazine, vol. 43, No. 8, Aug. 2005, pp. 123-131.

Jutand, F; et al "A New VLSI Architecture for Large Kernel Real Time Convolution" IEEE Conference Proceedings, Apr. 3, 1990, pp. 921-924.

Artieri, A; et al "A Versatile and Powerful Chip for Real-Time Motion Estimation" IEEE Conference Proceedings, May 23, 1989, pp. 2453-2456.

Beric, A; et al "Streaming Scratchpad Memory Organization for Video Applications" Proceedings of the IAESTED, International Conference on Circuits, Signals and Systems 2004, pp. 427-432.

Beric, A; et al "Low-Bandwidth Dynamic Aspect Ratio Region-Based Motion Estimation" Signal Processing Systems Design and Implementation, SIPS 2005, IEEE Workshop, Nov. 2005, pp. 393-398.

PCT/US09/34673, International Preliminary Report on Patentability (including Written Opinion), Aug. 24, 2010, 6 pages.

* cited by examiner

DATA PROCESSING SYSTEM

The invention relates to a data processing system and to a method for processing video data.

Today's data processing systems or processors are based on a certain memory hierarchy, comprising memories with different speed and sizes. However, as fast memories are expensive, the memory hierarchy is organized into several levels, wherein each level is smaller, faster and more expensive per byte than the next lower level. Usually, all data in one level can also be found in the level below and all data in the lower level can be found in the level below this one until the bottom of the hierarchy is reached.

A cache memory may constitute the first level of the memory hierarchy, i.e. it is the memory closest to a central processing unit CPU or a processing unit. If the CPU requests a data item, which can be found in the cache, a so-called cache hit has occurred. However, if the data item requested by the CPU cannot be found in the cache, a so-called cache miss has occurred. The time needed to correct the cache miss and fetch the requested data item depends on the latency and the bandwidth of the memory. The latency corresponds to the time for retrieving a first word of a block and the bandwidth relates to the time to retrieve the rest of a block. The basic idea of a cache is to fetch those data items, which will be needed during upcoming processing cycles before their actual processing.

Within the area of video processing, motion estimation is often used in video compression techniques. A video sequence typically consists of a series of video frames. The temporal redundancy between adjacent frames can be exploited to improve the compression of the video sequence. For motion estimation, a frame is selected as a reference frame and subsequent frames are predicted from the reference frame. A video frame is typically divided into macroblocks, wherein each macroblock within a frame is compared to a macroblock in the reference frame and the best matching macroblock is selected. The search for the best matching macroblock is performed over a predetermined area the so-called search area. A vector is determined which represents the displacement of the macroblock in the reference frame with respect to a macroblock in a current frame. In order to reduce the computational costs relating to the search, the search area is restricted.

For more information regarding the multi-level buffering for video applications, please refer to "Streaming Scratchpad Memory Organization for Video Applications", by Beric et al., Proceedings of the IAESTED International Conference on Circuits, Signals and Systems 2004, 2004, pp. 427-432. Here, a scratchpad memory is shown for providing a multi-level buffering of video data from an image memory. For example, video processing algorithms like de-interlacing, picture rate up-conversion, spatial scaling, video (de/en) coding, noise reduction, etc. need specialized memory subsystems to meet the performance requirements. A search area is defined by limiting the range of the vector. The size of such a search area may vary depending on the application requirements. One example of a size of a search area can be 5×3 blocks. The size of the scratchpad is selected as being larger than the search area.

In "A 27 mW 1.1 $mm^2$ Motion Estimator for Picture-Rate Up-converter" by Beric et al., $17^{th}$ International Conference on VLSI design (VLSI design 2004), January 2004, Mumbay, India, a motion estimator is described with an image memory, a L1 scratchpad and a L0 scratchpad. The L0 scratchpad stores the entire search area as required by the motion estimation algorithm.

In "Low-Bandwidth Dynamic Aspect Ratio Region-Based Motion Estimation" by Beric et al. a two level memory hierarchy system for motion estimation is shown. A L0 scratchpad serves to hold the search area of the motion estimator. The L1 scratchpad is used to reduce the bandwidth requirements towards an off-chip image memory. The L1 scratchpad is designed to hold for example one region in the image or one region of a video frame. Here, the motion estimation is based on a region-based scanning. In the region-based approach, the image is divided into a number of regions and the motion estimation is performed within each of the regions independently.

Accordingly, systems for processing streaming video data may be based on a two-level memory hierarchy architecture in order to reduce a latency introduced by fetching data from a main memory. Here, a L0 buffer/scratchpad is located close to a processor or processing unit for buffering/caching data which the processor or processing unit requires for performing its processing. Furthermore, a L1 buffer/scratchpad is introduced for further reducing the bandwidth required for a communication with a main memory or an image memory. The L0 as well as the L1 buffer/scratchpad are typically provided on-chip, while the image memory or the main memory are provided off-chip. It is therefore desirable to reduce the bandwidth of a communication with the main memory as this communication may also be used by other processing units such that the bandwidth of the communication has to be shared among the particular processing units.

The L0 buffer/scratchpad typically comprises a limited chip area and therefore, it does not dissipate a lot of power. The L0 buffer/scratchpad is typically used to implement the search area. In contrast to the L0 buffer/scratchpad, the L1 buffer/scratchpad typically needs to accommodate a large amount of data such that the required chip area is larger and the L1 buffer/scratchpad requires a larger dissipating power.

FIG. 3 shows a schematic representation of a scheme for fetching data from a main memory into the scratchpad/buffer of a region-based motion estimation. In particular, a complete region is fetched from the main memory/image memory to the L1 buffer/scratchpad. A processing of the pixels stored in the L1 buffer/scratchpad is started. The data or pixels from the L1 buffer/scratchpad are fetched to the L0 buffer/scratchpad such that a processing unit can access this data to enable its processing. After the data in the L1 buffer/scratchpad has been processed, the L1 buffer/scratchpad needs to be filled with new data. This new data is preferably the data adjacent to the previously accessed region, i.e. the region that is right to the previous location. The scanning order for fetching data is indicated in FIG. 3 by a meandering line SO. Preferably, the region to be scanned is selected as relatively large and a meandering scanning order SO, is chosen. However, this scanning order SO is broken if the region does not cover the full width of a video frame or screen S if the region to be scanned is moved to a location which is right from the previous location. Accordingly, the meandering scanning order SO is interrupted such that the quality of the processing is impaired.

It is therefore an object of the invention to provide a data processing system with a memory for buffering video data, which requires less chip area without impairing the performance or quality of its processing.

This object is solved by a data processing system according to claim 1 and by a method for processing video data according to claim 7.

Therefore, a data processing system for processing video data on a window basis is provided. At least one first memory unit is provided for fetching and storing video data from an image memory according to a first window in a first scanning order. At least one second memory unit is provided for fetching and storing video data from the first memory unit according to a second window in a second scanning order. At least one processing unit is provided for performing a video processing on the video data of the second window stored in the at least one second memory unit based on the second scanning order. The second scanning order corresponds to a meandering scanning order which is substantially orthogonal to the first scanning order.

As the second scanning order is orthogonal to the first scanning order, there is no need to break the scanning order if a window under process is moved to process subsequent data. Furthermore, data can be fetched on a line-wise basis from the image memory to the first and second memory unit.

According to an aspect of the invention, the second scanning order is performed by scanning in a direction of the second scanning order, by taking one step in the direction of the first scanning order, by reversing to scanning in a direction orthogonal to the direction of the first scanning order and by taking a step in the direction of the first scanning order. Accordingly, by this meandering scanning scheme, it can be ensured that no break in the scanning order will be required.

The invention also relates to a method for processing video data on a window basis. Video data from an image memory are fetched and stored in at least a first memory unit according to a first window in a first scanning order. Video data from the first memory unit is fetched and stored in at least one second memory unit according to a second window and a second scanning order. A video processing is performed on the video data of the second window stored in the at least one second unit based on the second scanning order. The second scanning order is a meandering scanning order which is orthogonal to the first scanning order.

The invention relates to an idea to rotate the scanning order, i.e. the direction of meandering, by 90°. Accordingly, there will be no break in the scanning order if the region under process is moved to process subsequent data. While a few columns are processed, subsequent data can be downloaded, i.e. it can be refilled while the processing is ongoing RWP. Accordingly, the region only needs to be shifted by one column to refill data. As this is a sequential process, the processing data can be performed in parallel.

By implementing a meandering scanning order pattern which is orthogonal to the main direction, the video data from the main memory is fetched into the L1 scratchpad/buffer on a line-wise basis. Thereafter, the data in the L1 scratchpad/buffer is fetched to the L0 scratchpad/buffer in a line-wise basis, wherein the directions of the lines as fetched by the L0 scratchpad/buffer is identical to the directions the lines fetched by the L1 scratchpad/buffer.

Other aspects of the invention are defined within the dependent claims.

The embodiment of the invention will now be described with reference to the figures.

Figure 2A:
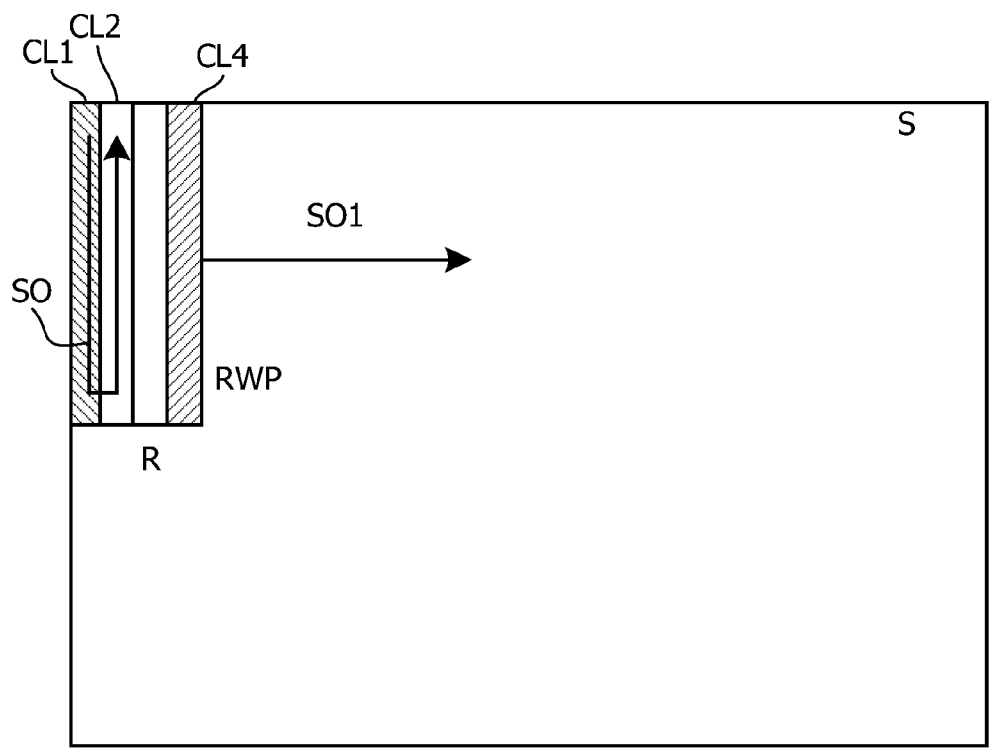
Figure 2B:
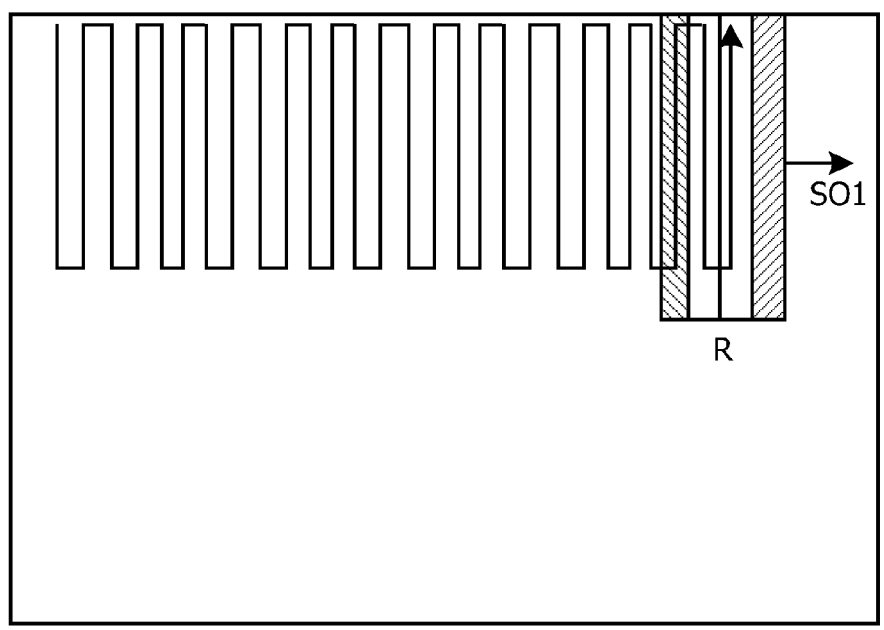
Figure 3A:
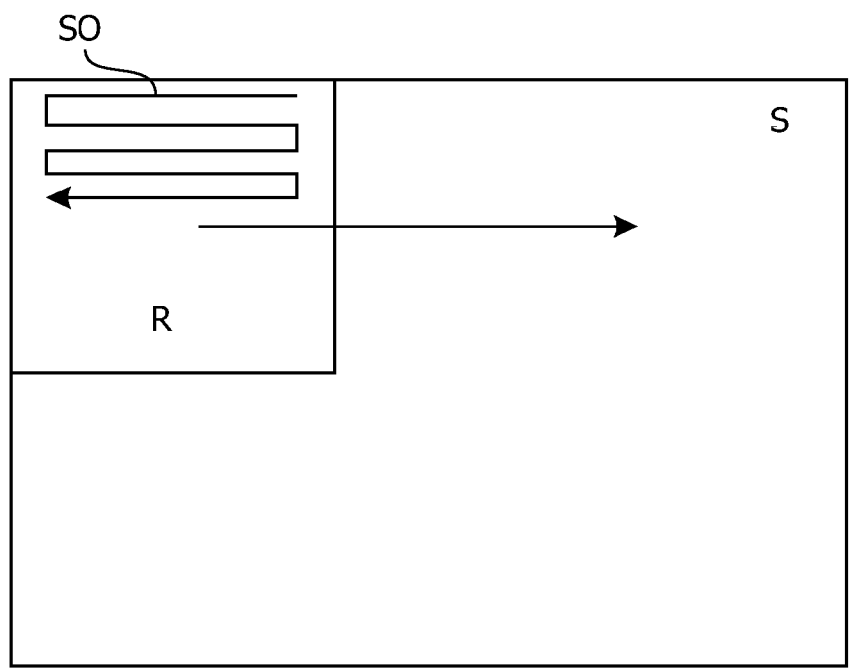
Figure 3B:
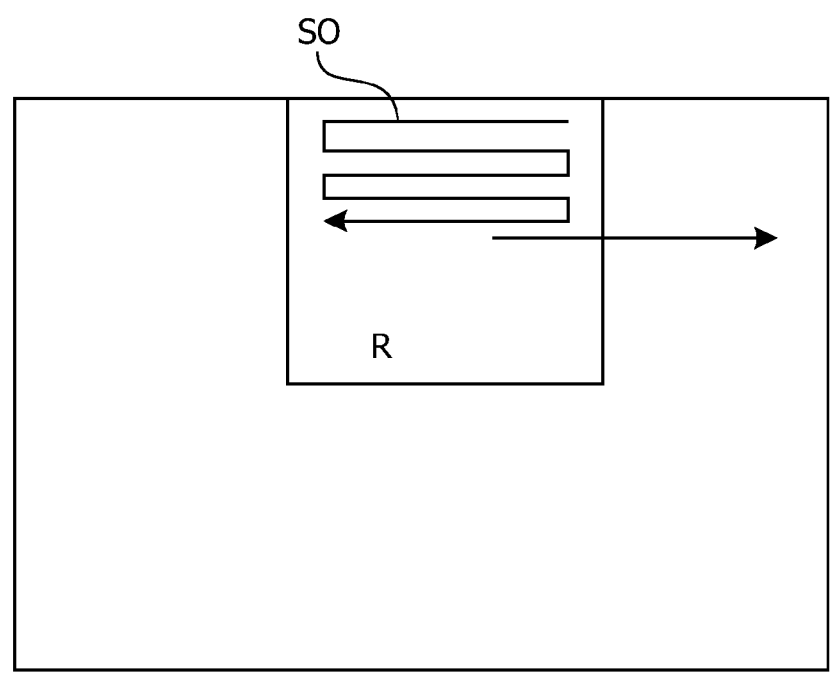

FIG. 1 shows a basic architecture of a data processing system according to the invention, FIGS. 2A and 2B show a schematic illustration of the scanning of a region-based motion estimation according to an embodiment of the invention, and FIGS. 3A and B show a schematic illustration of a region-based motion estimation scheme for fetching data from a main memory according to the prior art.

FIG. 1 shows a basic architecture of the data processing system according to a first embodiment. The data processing system comprises a plurality of processing units PU for performing dedicated or general processing. A L0 buffer/scratchpad is associated to each of the processing units PU. The L0 buffers/scratchpads are coupled to a L1 buffer/scratchpad. The L1 buffer/scratchpad serves to scratchpad/buffer data from the image memory or the main memory IM. The main memory IM constitutes preferably an external memory but may also be implemented on chip. Furthermore, a controller C is provided for controlling the buffering/caching/scratch pad operation of the L1 buffer/scratch pad and the L0 buffer/scratchpad. The controller C, the processing units PU and the buffers/scratchpads are preferably provided on chip OC. The controller C is preferably implemented in the L0 and the L1 buffer/scratchpad, respectively. Hence the controller is implemented in a distributed manner.

The data processing system according to the first embodiment may be used to perform motion estimation on a stream of video data to implement a motion estimator. The stream or at least part of the stream may be stored or buffered in the main memory IM. By means of the L1 and L0 buffer/scratchpad the video data from the main memory IM are fetched such that one of the processing units can perform the required video processing on the video data. The manner or scheme how the video data are fetched from the main memory IM to the L1 buffer/scratchpad and from the L1 buffer/scratchpad to the L0 buffer/scratchpad and finally to the processing unit PU is controlled and/or initiated by the processing unit PU. Preferably, this fetching scheme can be modified or amended by the processing unit PU. Accordingly, the fetching scheme is programmable and in particular programmable at run-time.

The motion estimation according to the first embodiment preferably relate to a region-based motion estimation. The L0 buffer is designed to accommodate the search area of the motion estimation and/or the motion compensator. The L1 buffer is preferably designed to accommodate a region of video data on which the motion estimation can be performed.

As an example, the motion estimation may be based on the three-dimensional recursive search 3DRS block matching algorithm. It should be noted that also other matching algorithms may be implemented. The image is divided into a number of regions and the motion estimation is performed for each of the regions independently. When all data within the region have been processed a next region is selected.

FIG. 2 shows a schematic illustration of the scanning of a region-based motion estimation according to an embodiment of the invention. FIG. 2A shows a schematic representation of a region under process within a screen S that is scanned. In FIG. 2A a main scanning order SO1 is horizontal, i.e. from left to right. The region under process, i.e. the data fetched to the L1 buffer, is chosen to be smaller than in the prior art. This is because the direction of the scanning order SO is rotated by 90°, i.e. the scanning starts with scanning along the first column CL1 downwards and then at the end of the first column CL1, the scanning is shifted to the right and then the second column CL2 is scanned upwards. Accordingly, the scanning can be performed in a continuous way moving through the frame and processing the respective data without the need to break the scanning order SO. During the scanning of the region under process, a column CL4 can be refilled while processing RWP. After this column CL4 has been filled, the region R is shifted by one column and the scanning is continued as before. Accordingly, the region is not shifted region-wise but column-wise or line-wise. Since this is a sequential process which may be performed in parallel with the processing of data, the efficiency of such a processing can be improved. In comparison to the prior art scheme as described with regard to FIG. 3, where a double buffering of the complete region is required in order to provide a parallel processing, the scanning according to FIG. 2 is much easier and does not require a scanning break.

Alternatively, the main scanning order may be from top to bottom. In such a case, the meandering scanning order SO would be orthogonal to the main scanning order such that the scanning will start for a first line, for example from left to right, then one step in the main scanning order direction, then scanning from right to left and again a step in the main scanning direction and so on.

The application which is performed on the processing unit may be able to program the main scanning order as well as the scanning order of the fetching of the data from the image memory IM and the L1 buffer/scratch pad.

In FIG. 2B, a situation is shown where the scanning has already proceeded in time. It should be noted that although the region R in FIGS. 2A and 2B merely comprises 4 columns, this particular number of the columns is selected to illustrate the underlying principles of the invention. The region R may also accommodate more columns.

The fetching of video data from the main memory or the image memory IM into the L1 scratchpad is performed by sliding orthogonal to the direction of the motion estimation. During the sliding operation those columns or lines which is the oldest and which is not required anymore is replaced by a column.

According to a further embodiment of the application, an above described data processing system is implemented based on CMOS12 technology taking into account High Definition TV (HDTV) screen sizes and algorithms applied to this size. The best effect is achieved for a case where large screen sizes need to be supported.

Now the resulting saving regarding the area is described by analyzing the cost reduction of the size of a HDTV (as the standard proposes), which may go up to 1920*1080i (interlacing application) pixels. This may be translated into blocks of 8*4 pixels, i.e. 240*135 blocks. One Search Area requirement for high performance (the requirement is actually proposed as the limit of the motion vectors) may correspond to 21*13 blocks, i.e. the L1 buffer/scratchpad must be able to accommodate at least 21+1 blocks and the L0 buffer should be able to accommodate 21 blocks. The typical size of the region sketched according to FIGS. 3A and 3B may be 69*26 blocks=1794 blocks which may correspond to an area of 2.2 mm2. To accommodate the above search area of width of 21 blocks, the region according to the invention may be selected to accommodate 64*14 blocks=896 blocks=1.2 mm2. This L1 aspect ratio and dimensions support sufficient meandering width. In other words, picture quality is less impaired compared to the case of 69*26 block of the prior art region-based approach. Namely, the prior art case assumes an interruption of scanning in vertical domain after each 26−2*13/2 blocks (the refresh of L1 is happening then). According to the invention, however, there are no interruptions in the vertical domain at all. The L1 may be replicated up to 6-10 times to support algorithms that use multiple field/frame references, i.e. the difference in two approaches is more than significant, namely: 6 to 10 mm2.

Accordingly, the invention relates to a video processing system with a two level buffer (L1 and L0). The video processing is performed on a window basis, i.e. one window after the other. The video data to be processed is typically extracted from an external memory to the L1 buffer such that the video data relating to a first window is stored in the L1 buffer. Video data from the L1 buffer is fetched into the L0 buffer such that video data relating to a second window is stored in the L0 buffer, wherein the second window is a subset of the first window. The processing by a processing unit being associated to the L0 buffer is performed on the basis of the second window. A controller may be provided for controlling the buffers L0, L1. The controller may be contained in the buffer such that L1 has its own controller and L0 has its own controller and the controller is implemented in a distributed manner. The processing unit is adapted modify the scanning order.

The invention also relates to a motion estimator with a two-level buffer (L0, L1) for buffering video data from an image memory. The size of the L0 buffer is selected to accommodate the search area of the motion estimation. The size of the L1 buffer is selected to accommodate the region of the motion estimation to perform a region-based motion estimation. The regions for the motion estimation is fetched from the image memory according to a direction of the motion estimation. The fetching from the L1 buffer to the L0 buffer and the processing of the video data in the L0 buffer is preformed in a meandering scanning order wherein the scanning order is orthogonal to the direction of the motion estimation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. Data processing system configured to process video data on a window basis, comprising:
   at least one first memory unit configured to fetch and store video data from an image memory according to a first window in a first scanning order;
   at least one second memory unit configured to fetch and store video data from the first memory unit according to a second window in a second scanning order;
   at least one processing unit configured to perform video processing on the video data of the second window stored in the at least one second memory unit based on the second scanning order; and
   wherein the second scanning order is a meandering scanning order being orthogonal to the first scanning order.

2. Data processing system according to claim 1, further comprising:
   a controller unit configured to control the fetching and storing of video data of the at least one first and at least one second memory unit.

3. Data processing system according to claim 1, wherein, the second scanning order is performed by scanning in a direction of the second scanning order, taking one step in the direction of the first scanning order, then reverse to scanning in a direction orthogonal to the direction of the first scanning order, and by taking a step in the direction of the first scanning order.

4. Data processing system according to claim 1, wherein the direction of the first scanning order is horizontally or vertically.

5. Data processing system according to claim 1, wherein the at least one processing unit is adapted to change the first and/or second scanning order.

6. Data processing system according to claim 1, wherein the fetching of video data from the image memory into the first memory unit is performed by sliding in the direction of the first scanning order.

7. Method for processing video data on a window basis, comprising the steps of:
fetching and storing video data from an image memory in at least one first memory unit according to a first window in a first scanning order;
fetching and storing video data from the first memory unit in at least one second memory unit according to a second window based on a second scanning order;
performing a video processing on the video data of the second window stored in the at least one second memory unit based on the second scanning order; and
wherein the second scanning order is a meandering scanning order being orthogonal to the first scanning order.

8. Method for processing a stream of video data for display on a scanned display screen comprising:
transferring a subset of the stream of video data, according to a first scanning order, to a scratchpad memory for the purpose of performing motion estimation;
defining a second subset of video data within the scratchpad;
processing in a continuous scanning manner the second subset of video data by scanning the second subset of video data in a direction that is orthogonal to the first scanning order of the motion estimation processing; and
sequentially updating the second subset of video data.

9. Method for implementing a motion estimator comprising:
sequentially fetching a plurality of regions of video data in accordance with a first selected scanning direction;
performing region-based motion estimation processing of the video data in a meandering scanning order wherein the scanning order is orthogonal to the first selected scanning direction.

10. The method for implementing the motion estimator of claim 9 comprising processing multiple regions without interruption in the vertical domain.

* * * * *